July 6, 1926.

L. J. BUTTOLPH 1,591,113

METHOD AND APPARATUS FOR ELECTRIC WELDING

Filed August 30, 1924

INVENTOR
Leroy J. Buttolph
Thos. H. Brown
HIS ATTORNEY

Patented July 6, 1926.

1,591,113

UNITED STATES PATENT OFFICE.

LEROY J. BUTTOLPH, OF EAST ORANGE, NEW JERSEY, ASSIGNOR TO COOPER HEWITT ELECTRIC COMPANY, OF HOBOKEN, NEW JERSEY, A CORPORATION OF NEW JERSEY.

METHOD AND APPARATUS FOR ELECTRIC WELDING.

Application filed August 30, 1924. Serial No. 735,206.

My present invention relates to method and apparatus for electric welding of parts of the same cross section or of parts having different cross section at the point of weld.

In the welding together of parts of different cross section the heat necessary to raise the part of larger cross section to welding temperature generally overheats the part of smaller cross section as the current necessary to produce a satisfactory arc is in excess of the current carrying capacity of the smaller wire with the result that said smaller wire is materially changed in character and weakened to such an extent that its service is impaired, and the same is true of parts of equal cross section unless the current effect on said parts can be modified promptly.

I have discovered that by surrounding the part of smaller cross section, in such cases, with a sleeve of material such as carbon near the point of the weld that such overheating is eliminated and that a permanent and serviceable weld is secured.

It is therefore the object of my invention to provide a method for welding parts with different cross section or of the same cross section in which detrimental heating effects are eliminated.

It is also an object of my invention to provide in apparatus for welding parts of different cross section or of the same cross section means for cooling the weld itself quickly and automatically. Other objects of my invention will appear from the specification and the accompanying drawing forming a part thereof.

It is further an object of my invention to decrease the current density in a part welded immediately upon the accomplishment of the welding thereof.

Figure 1:
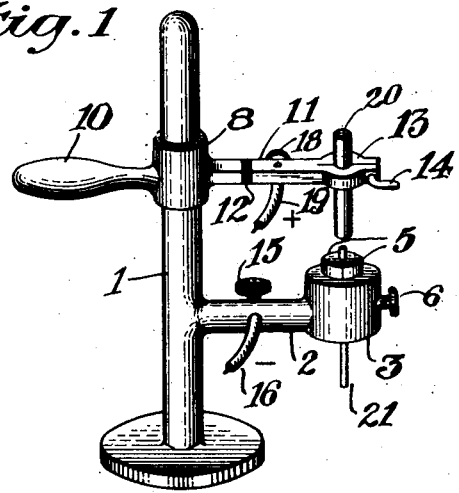
Fig. 1 is a perspective elevation view of the apparatus of my invention showing two clamps insulated one from the other, one adapted to hold the piece to be welded of a comparatively large cross section and the other clamp adapted to hold a piece of smaller cross section to be welded to said larger piece and heat dispelling means positioned about said smaller piece.
Figure 2:
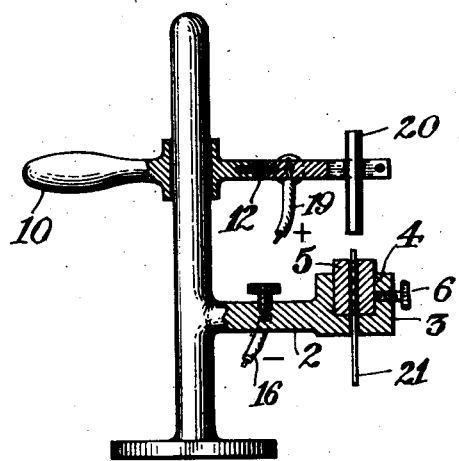
Fig. 2 is a vertical elevation view in part section of the apparatus of Fig. 1.
Figure 3:
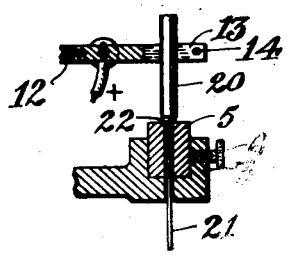
Fig. 3 is a sectional view of the clamps and welded parts of the apparatus of Fig. 1 and the welded parts therein after the welding operation.

In the drawing the standard 1 carries a horizontally extending arm 2 which supports at its outer end the boss 3 having formed therein the counter bore 4 in which is positioned the split sleeve 5 of carbon or graphite. The screw 6 threaded through said boss 3 serves to hold said sleeve 5 in the clamped position or for releasing it from such clamped position. The boss 8 slidably mounted on said standard 1 above said arm 2 carries a handle 10 and the horizontally projecting arm 11 which has interposed in its length the insulating member 12. The outer end of said arm 11 terminates in a spring clamp 13 which is opened and closed by means of the hand bolt 14. Said clamp 13 is of such a distance from said standard 1 as to be positionable with its center above the center of said split sleeve 5. The thumb screw 15 holds the supply main 16 connected to said arm 2 which together with said boss 3 is of suitable conducting material such as copper. Similarly the screw 18 holds the main 19 in the outer section of arm 11 which is also of suitable conducting material such as copper.

In the use of the apparatus of my invention a piece of metal 20 to be welded such for instance as tungsten is positioned in said clamp 13 and a smaller piece of metal 21 also of tungsten and which for example is to be welded to said larger piece 20 is positioned between the parts of said split sleeve 5 and clamped therebetween by means of said screw 6, a sufficient portion only of said piece 21 being left projecting above said sleeve 5 to supply metal for the weld. The said means 16 and 19 being connected to a suitable source of supply such as is well known in the art the piece 20 is moved by means of said handle 10 to a position directly over said piece 21 and moved downwardly thereagainst into contact therewith whereby through either the contact resistance or an arc drawn therebetween or both such as are well known in the art the upper end of piece 21 and lower end of piece 20 are brought to a welding temperature. In this operation the movement of part 20 against piece 21 results in the pressing of the end of said wire 21 into a button 22 onto the upper surface of said clamp 5 which further results in a considerable increase in contact area between said piece 21 and clamp 5. This increase in contact area of the piece 21 and clamp 5 results in the diverting of the greater part of the current from piece 20 by said clamp 5 whereby there is precluded the possibility of the main part of piece 21 being over heated by passage of excessive current therethrough, and the wire 21, therefore, throughout is preserved intact without development of a weak point anywhere throughout its length.

While I have illustrated my invention in relation to tungsten it is to be understood that the invention is applicable to welding of other metals. Further the said sleeve 5 conducts excess heat from said piece 21 and thereby physically and electrically serves to prevent any overheating which might result in the deterioration of said piece 21 or in preventing the accomplishment of a desirable weld between the two said parts. Suitable switching means not shown but well known in the art are provided in the supply mains for turning off the current after a predetermined welding period has elapsed.

In welding together pieces of equal or comparable cross section I employ clamps of material which will not weld to each other nor to the parts to be welded and move the clamped pieces together until the clamps abut either against each other or against a portion of the parts welded formed by their union and enlarged in cross section resulting from the flow and spread of the softened material. When desirable I provide the clamps, one of which may be of metal, at their outer ends with counter bores or chambers for the molding of such enlarged and flowed metal. Thus at the instant of the weld I secure effectual cutting down of the current passing through the weld simultaneously with the accomplishment of the weld and in this way protecting the parts of the welded metal contiguous to the weld from being crystallized.

I claim:

1. The method of welding two pieces which comprises clamping the said pieces in clamps of material which will not weld together, and moving said clamps and pieces together under welding heat until said clamps abut.

2. The method of electric welding two parts which comprises clamping the parts to be welded between material which will not weld to the pieces to be welded, and moving said parts under welding current until said larger part abuts against the clamp of said smaller part, whereby the current from the larger piece is distributed between the respective pieces and their clamp and simultaneously therein the weld is cooled.

3. The method of electric welding two parts which comprises clamping the parts to be welded between material which will not weld to the pieces to be welded nor to each other, and moving said parts under welding current until said larger part abuts against the clamp of said smaller part, whereby the current from the larger piece is distributed between the respective pieces and their clamp and simultaneously therewith the weld is cooled.

4. The method of electric welding parts of different cross section which comprises clamping the parts to be welded, the smaller with an end projecting and in a clamp of material which will not weld to the parts to be welded, and relatively moving said parts under welding current until said metal at the weld abuts against the clamp of said smaller part, whereby the current from the larger piece is distributed between the respective pieces and their clamp and simultaneously therewith the weld is cooled.

5. In apparatus for electric welding, clamps of nonwelding material about the parts to be welded, electric connections to the parts to be welded, and means for moving together the parts to be welded and simultaneously with such welding shunting a part of the welding current through said clamps whereby the weld is automatically cooled.

6. In an apparatus for electric welding, clamps about the parts to be welded one of said clamps being of nonwelding material, electric connections to the parts to be welded, and means for moving the parts together to be welded and simultaneously with such welding shunting a part of the welding current through said clamps whereby the weld is automatically cooled.

7. In apparatus for electric welding pieces of areas of different size a clamp for the piece of smaller cross section positioned close to the point of welding of a size and specific heat conductivity to give a resulting conductivity comparable to that of the larger piece.

8. In apparatus for electric welding pieces of different cross section a clamp of carbon or graphite about and near a projecting portion of the piece of smaller cross section having a surface for receiving such portion of said piece as is normally softened during the weld and displaced by the larger piece thereby and for diverting a part of the current passing through said larger piece and displaced portion of said smaller piece, whereby excessive current density in the main and unheated portion of the smaller piece is prevented.

Signed at Hoboken in the county of Hudson and State of New Jersey this 28th day of August, A. D. 1924.

LEROY J. BUTTOLPH.